United States Patent
Gore et al.

[15] 3,696,639
[45] Oct. 10, 1972

[54] CLUTCH FOR USE IN THE PLUMBING FIELD

[72] Inventors: William C. Gore, Elgin; Eugene B. Shapiro, Highland Park, both of Ill.

[73] Assignee: Beatrice Foods Company, thru its division Chicago Specialty Manufacturing Co., Skokie, Ill.

[22] Filed: Feb. 8, 1971

[21] Appl. No.: 113,139

[52] U.S. Cl. ................................. 64/29, 81/52.4 R
[51] Int. Cl. .............................................. F16d 7/00
[58] Field of Search............. 64/29; 144/32; 81/52.4 R

[56] References Cited

UNITED STATES PATENTS

| | | |
|---|---|---|
| 1,328,087 | 1/1920 | Lechot....................81/52.4 R |
| 2,400,712 | 5/1946 | Prather et al..........81/52.4 R X |
| 2,523,584 | 9/1950 | Miller..........................64/29 X |
| 3,167,936 | 2/1965 | Engquist..........................64/29 |
| 2,576,069 | 11/1951 | Hoag et al. ......................64/29 |
| 1,466,148 | 8/1923 | Sands ..............................64/29 |
| 2,477,521 | 7/1949 | Martin.............................64/29 |
| 2,744,396 | 5/1956 | Nagy et al...................64/29 X |

*Primary Examiner*—Allen D. Hermann
*Attorney*—Max R. Kraus

[57] ABSTRACT

A power driven clutch for driving a wire auger, blade, screwdriver bit, socket wrench, and the like, which clutch may be molded of plastic and which comprises a carrier or driven member, a driver which may be connected to an electric power source such as an electric drill motor, and where the driver has means for engaging a member on the carrier or driven member to operate said carrier or driven member for rotation, and wherein the driver is rotatable with respect to the carrier and is axially movable with respect to the carrier. The driver when in positive engagement with the carrier member is adapted to rotate said carrier member, and the driver adapted when the object to be rotated and carried by the carrier member strikes an obstruction which impedes or prevents its rotation will operate to cause the driver to move axially with respect to the carrier so that the driver may continue to rotate without imparting a corresponding rotation to the carrier or driven member.

3 Claims, 3 Drawing Figures

PATENTED OCT 10 1972　　　　　　　　　　　　　　3,696,639

INVENTORS
WILLIAM C. GORE
EUGENE B. SHAPIRO
BY
Max R. Kraus
ATTORNEY

CLUTCH FOR USE IN THE PLUMBING FIELD

BRIEF SUMMARY OF THE INVENTION

One of the objects of this invention is to provide a power driven clutch means for driving a wire auger, screwdriver bit, socket wrench, and the like, wherein the clutch will operate to positively drive the carrier or driven member until such time that rotation of the carrier or driven member is arrested by virtue of the object supported thereby engaging an obstruction which prevents its continued rotation, and wherein during said obstruction when the carrier or driven member is not rotating the clutch means will become disengaged so that the driver may continue to rotate without imparting a corresponding rotation to the carrier or driven member.

Another object of this invention is to provide a structure of the foregoing character in which the carrier member and driver may be molded of a plastic material and wherein means are provided for visually determining whether the clutch means is serving to drive the carrier or whether it is slipping with respect thereto.

Other objects will become apparent as this description progresses.

Figure 1:
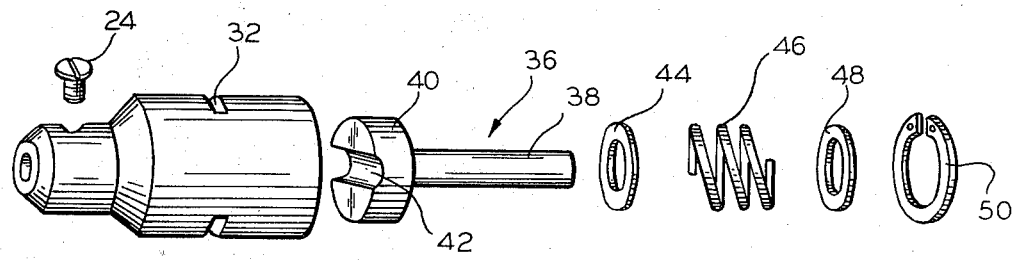
FIG. 1 is an exploded view of the parts of the clutch forming this invention.
Figure 2:
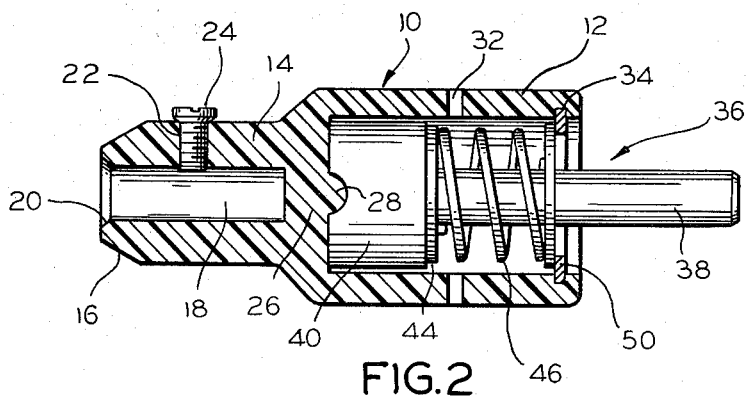
FIG. 2 is a longitudinal sectional view of the clutch in assembled relation.
Figure 3:
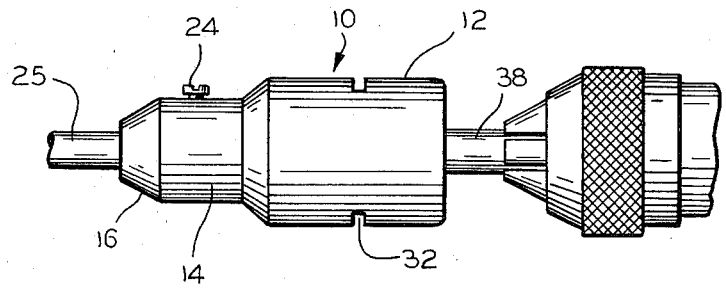
FIG. 3 is a view of the clutch connected to a power tool.

The device comprises a carrier member generally indicated at 10, which may be also termed as the driven member, and same comprises a cylindrical-shaped body 12 which is hollow. Extending forwardly of said cylindrical body is a reduced cylindrical forwardly extending portion 14 which has an inwardly tapering end 16 at the front thereof. The forwardly extending portion 14 is provided with a longitudinal bore 18 which has a tapering or chamfered end 20. The forwardly extending portion 14 is provided with a transversely extending bore 22 which is countersunk and which is internally threaded to receive a threaded bolt or screw 24 which extends into the interior of the longitudinal bore 18 and serves to lock the object, generally indicated at 25, to be rotated, which may be the wire auger, screwdriver bit or socket wrench which is inserted into the longitudinal bore 18 of the carrier. A transverse wall 26 extends between the cylindrical portion 12 of the carrier and the forwardly extending portion 14 and said wall 26 has formed therewith a centrally positioned rib 28 which has a rounded surface.

The cylindrical portion 12 of the carrier is centrally provided with a pair of diametrically opposed transversely extending slots 32, the purpose of which is to permit a visual inspection of the interior by viewing same through said slots. The rear end of the cylindrical portion 12 of the carrier is provided with an annular groove 34.

The driver, generally indicated at 36, comprises a stem 38 and an enlarged annular head 40. In the face of said head and extending across the diameter thereof is a concave recess 42. The concave recess 42 is shaped to complement the rib 28 on the wall 26 of the carrier as it is adapted when in positive engagement therewith to make contact with said rib to drive said carrier or driven member 10. The driver 36, principally the head 40 and a portion of the stem 38, is supported within the cylindrical portion 12 of the carrier.

A flat washer 44 is positioned around the stem of the driver and is adapted to abut against the rear of the head 40. A spring 46 is positioned around the stem 38 with the forward end of the spring engaging the flat washer 44. Another washer 48, similar to washer 44 is also positioned around said stem and is adapted to be engaged by the rear of said spring. A spring ring 50 is positioned inside the cylindrical portion 12 of the carrier and is confined in the annular groove 34 and engages the washer 48 to hold all of the parts in position in said carrier.

The rear portion of the stem of the driver extends exteriorly and rearwardly of the housing 12 and is adapted to be engaged by a source of rotative power, such as an electric drill motor or the like, generally indicated at 52, for rotating said driver.

Under normal conditions, the concave recess 42 in the head 40 of the driver will be in positive engagement with the rib 28 on the carrier or driven member and the spring 46 will normally urge the driver to be in the said positive driving position. As long as the driver 36 is thus engaged and is being rotated it will impart a corresponding rotation to the carrier or driven member 10 and will rotate the object 25 to be driven which is carried by the carrier member or driven member 10. In this condition the driver 36 will rotate simultaneously with the carrier 10 which it is driving. However, should the object 25 held by the carrier 10 strike an obstruction and be prevented from continued rotation while the driver 36 is continuing to rotate, it will cause the overload which will force the driver 36 rearwardly or axially with respect to the carrier and effect a disengagement between the concave recess 42 and the rib 28 on the carrier. This permits the driver to continue to rotate without effecting a corresponding rotation to the carrier. During the rearward axial movement of the driver with respect to the carrier the spring 46 will be compressed. Thus, the driver when in a clutching position is secured to the carrier in a driving position so that the driver rotates with the carrier and in fact drives the carrier, and when in non-clutching position the driver 36 will be caused to move axially rearward to effect disengagement between the driver and the carrier so that the continued rotation of the driver does not effect a rotation of the carrier. As the driver 36 thus slips it will move past the opposed slots 32 in the carrier, giving a visual indication, as well as an audible indication, that the clutch is slipping. The driver 36 may be colored differently from the carrier so that the different color would be readily visible through the slots 32.

The carrier or driven member 10 and the driver 36 may be molded of a plastic material, such as nylon, delrin, or the like, which lends itself to injection molding, or the parts may be made of metal and machined. However, the simple construction shown and described herein lends itself to injection molding at a reduced cost.

What is claimed is:

1. A clutch for rotating an object such as a wire auger, screwdriver bit, screw wrench, and the like, comprising an integrally formed carrier member having a cylindrical portion at the rear end thereof and a socket portion adjacent the opposite end with an intervening wall therebetween, said intervening wall having a rib extending across the diameter thereof and facing inwardly into said cylindrical portion, said rib having a rounded surface in cross-section, said socket portion comprising an annular bore for receiving the object to be rotated, a screw member extending into said bore for engagement with said object to couple same to said carrier member, a driver having a cylindrical head and a stem, with the head positioned in the cylindrical portion of the carrier adjacent and intervening wall and with the stem extending exteriorly of said cylindrical portion, said head having a concave surface extending across the diameter thereof which is shaped complementary to said rib for engagement therewith when driving said carrier, a coil spring around said stem with one end of said coil spring engaging the head and the opposite end engaging means on the carrier for normally urging said head towards said intervening wall and causing the concave surface of said head to be in engagement with said rib on the intervening wall for rotating said carrier with the rotation of the driver, yet permitting the driver to move axially rearwardly with respect to the carrier to effect disengagement to permit said driver to continue rotation without imparting a corresponding rotation to the carrier.

2. A structure as set forth in claim 1 in which the carrier and the driver are molded of a plastic material.

3 A clutch as set forth in claim 1 in which the carrier is provided with a slot whereby the position of the driver may be observed.

* * * * *

UNITED STATES PATENT OFFICE
CERTIFICATE OF CORRECTION

Patent No. 3,696,639                Dated October 10, 1972

Inventor(s) William C. Gore and Eugene B. Shapiro

It is certified that error appears in the above-identified patent and that said Letters Patent are hereby corrected as shown below:

Column 3:

Claim 1, line 15, change "and" (first occurrence) to --the-- .

Signed and sealed this 13th day of February 1973.

(SEAL)
Attest:

EDWARD M. FLETCHER, JR.
Attesting Officer

ROBERT GOTTSCHALK
Commissioner of Patents